T. H. McFARLAND.
Machines for Fitting and Welding the Ends of Tubes.

No. 154,699. Patented Sept. 1, 1874.

Attest:

Inventor:

UNITED STATES PATENT OFFICE.

THOMAS H. McFARLAND, OF CHICAGO, ILLINOIS, ASSIGNOR OF ONE-HALF HIS RIGHT TO WILLIAM H. McFARLAND, OF McFARLAND, MO.

IMPROVEMENT IN MACHINES FOR FITTING AND WELDING THE ENDS OF TUBES.

Specification forming part of Letters Patent No. 154,699, dated September 1, 1874; application filed June 4, 1874.

*To all whom it may concern:*

Be it known that I, THOMAS H. McFARLAND, of Chicago, in the county of Cook and State of Illinois, have invented a certain new and useful Machine for Scarfing and Welding Tubes for Steam-Generators, and for other purposes; and I do hereby declare that the following is a full and clear description thereof, which will enable others skilled in the art to which it pertains to make and use the same, reference being had to the accompanying drawings, and to the letters of reference marked thereon, which form a part of this specification, and in which—

Figure 1:
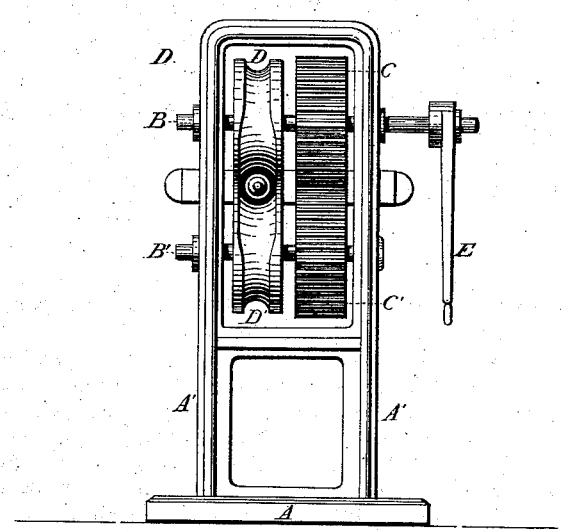
Figure 2:
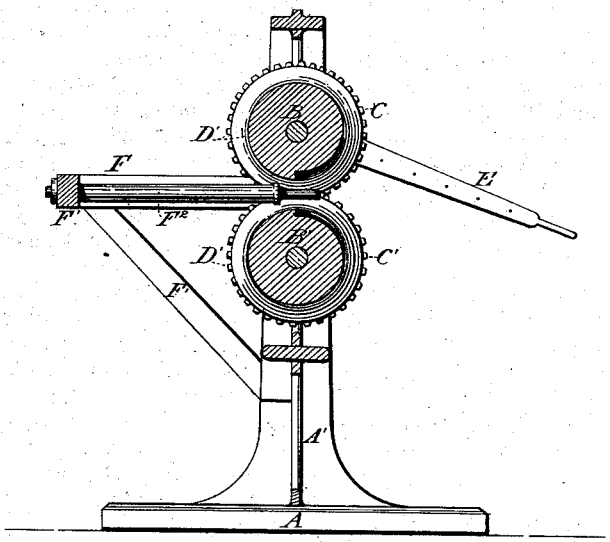
Figure 3:
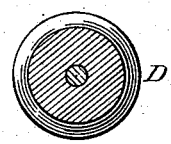

Figure 1 is a front elevation of my machine, showing the frame-work, the grooved rollers for grasping the tubes, the gear-wheels for giving motion to the lower grooved roller, the crank or lever for giving motion to the gear-wheels, the mandrel or former which receives and aids in forming the ends of the tubes, and a portion of the frame which supports said former. Fig. 2 is a vertical sectional elevation, showing the parts above referred to, and Fig. 3 is a sectional elevation of one of the grooved rollers.

Corresponding letters denote like parts in all of the figures.

The flues or tubes, in that class of steam-generators in which the small welded kind are used, are subject to various degrees of deterioration and wear, those portions which are nearest the fire-box being subjected to the greatest amount of wear and heat, and consequently to the most rapid deterioration, consequent upon the action of the cinders from the burning fuel entering them, and upon the damaging effects of the sulphur and other impurities found in coal.

The above-described effects are always more observable in or upon that portion of the flues of locomotives and other engines or generators which are in or near the fire-boxes than in the parts which are farther removed therefrom, and hence it frequently becomes necessary to remove such flues or tubes, and to weld pieces of new metal thereon, after having removed such portions as are found to be injured to such an extent as to render them unfit for further use.

The object of this invention is the production of a machine which shall be capable of preparing the ends of the tubes to be welded, for being united, by passing the reduced end of one part into the enlarged end of the other, and so forming what is technically called a "scarf," in order that such scarfed portions may be welded together, and the general surface of the flue or tube be left of the same diameter as before, and afterward causing the same set of grooved rollers, which aid in making the scarf, to weld the parts together. To this end the invention consists in a machine, in which grooved rollers are employed, which act in conjunction with mandrels or formers for first reducing the end of one of the parts to be welded, and then enlarging the other portion at one of its ends to such an extent as to cause it to receive the reduced portion of the other part, and finally to cause the parts to be welded, after having been heated to the proper temperature, by being passed between wheels, the grooves in which are of the proper diameter for that purpose.

In constructing machines of this character, I use a frame of metal or other suitable material, said frame resting upon a base, A, of suitable dimensions, and consisting of vertical parts A' A', with such cross-beams as are necessary to hold the said parts in position. In the parts A' A', and at the required distance apart, the shafts B B' are journaled. Upon each of these shafts there is placed a spur-gear wheel, which in the drawings are lettered C C'. These wheels are of equal diameter, and in corresponding pitch of teeth, in order that they may mesh together, and thus the one to which the driving mechanism is attached be made to drive the other. These wheels may be of any required diameter, and may be varied according to the diameter of the flues or tubes to be operated upon. Upon the shafts B B', and between the parts A A' of the frame, there are secured, by a feather or otherwise, rollers D D', the peripheries of which are provided with semicircular grooves, said grooves having in them segments of circles of different diameters, as shown clearly in Fig. 1 of the drawing, the office of which will soon be described. Upon the outer end of one of the shafts which carry the gear-wheels there is placed a lever or crank, E, for the purpose of giving a full or partial rotary movement to the wheels. When it is desirable to operate this machine by hand, the power is applied to the lever by the operator, but when operated by machinery a stud is to be placed in one of the holes formed in the lever or crank, and it may be placed nearer to or farther from the shaft, according as it is desirable to make the scarf on the tubes longer or shorter, as with a given amount of movement of the rod which is connected to the stud in the lever a greater or less amount of movement will be given to the periphery of the grooved rollers as the stud is moved toward or from the pivotal point of the crank.

In order that the flues or pieces of flues to be scarfed and welded may be held in their proper positions, there is attached to the main frame of the machine a supplemental frame, F, the office of which is to receive and hold in position the mandrel or former which gives form to the ends of the tubes.

This supplemental frame consists, in the present case, of two horizontal bars, which are firmly secured to the main frame, and extend rearward for any desired distance, their outer ends being rounded for the reception of a cross-bar, $F^1$, which carries the mandrel or former $F^2$.

The cross-bar $F^1$ may be made adjustable upon the frame F by rounding a greater portion of the ends thereof, and by placing a nut upon the inside of said bar $F^1$ as well as upon the outer side thereof, and such adjustability will afford another means of regulating the length of the scarf, as well as enable the operator to make the weld at any desired distance from the end of the tube, as carrying the bar a greater or less distance from the grooved rollers will also carry the former and its collar a greater distance therefrom, and thus allow a greater length of the flue to be brought under the action of said rollers.

The former $F^2$, above alluded to, consists of a rod of metal, which passes through the cross-bar $F^1$, and is secured thereto by a nut, as shown, its opposite end extending inward such a distance as to bring it between the grooved rollers, in order that when the end of a flue is placed thereon it may be grasped by said rollers and pushed upon said former, and thus have its end reduced in size or increased according to the position in which the rollers are placed when they act upon it, and to the size of the inner end of the former, said inner end being larger or smaller, according as it is desired to enlarge or reduce the diameter of the end of the tube, and being slightly tapering at its extreme inner end to allow the tube to enter upon it.

Two or more of these formers may be used, one having its inner end made of the proper diameter for the reduction of the end of one portion of the tube, and another for the enlargement of the other, and they may be changed according to circumstances.

To prevent the tubes from being pushed too far on the former, there is placed thereon a collar, against which, in scarfing, the end strikes, and thus the length of the scarf can be determined.

As a further means of adjusting the position of the former and its collar, the outer end thereof may be rounded and supplied with a nut, both inside and outside of the bar which carries it.

The parts of the machine having been constructed and arranged substantially as described, its operation will be as follows:

When a defective flue or tube is to be lengthened, one end thereof is to be heated and placed upon or against the end of the former, the parts of the machine at such times being in the positions shown in Fig. 1, or in such positions as to bring the enlarged portions of the grooves in the grooved rollers directly opposite the former, when, by a proper movement of the crank E, the wheels will be partially rotated, and the smaller diameters of the grooves will be brought in contact with the tube, and it will be griped thereby and carried onto the former until its end comes in contact with the collar on said former, when its further movement will be arrested, in doing which the diameter of that portion of said tube which has been forced upon the former will have been reduced to the desired extent, the differences in the diameters of the parts of the grooves having been made with reference thereto.

When the required amount of reduction has been effected, and as the crank is, by its driving mechanism, put in motion in the opposite direction, the smaller circle of the grooved rollers will come in contact with the tube and force it off from the former, or, as it is still in a heated condition, it may be easily drawn off by the operator.

For enlarging the end of the part to be attached to the reduced portion of the part above referred to, the end of the former is to be of the required size, and the smaller portions of the segments of the circles are to be brought opposite thereto, and the tubes inserted, when they will be grasped and carried onto said former and enlarged, the larger parts of the grooves in the rollers permitting such enlargement, after which it may be removed from the former, as above described.

When the two parts of the tube have been prepared, as above described, they are to be reheated and replaced between the grooved rollers, which, upon having the required movement imparted to them, will press the parts into such contact with each other as to cause them to be welded together, and at the same time the enlarged portion will be reduced to its proper diameter, so that it may be passed through the aperture in the tube-sheet.

I claim as my invention—

In an improved machine for scarfing and welding together sections of tubing, the combination of two rollers, each having in or around its periphery a groove having different diameters, the grooves in the one corresponding in all respects to that of the other, interchangeable mandrels of different diameters, each having a collar upon it to determine the length of the scarf, and a crank or equivalent device for operating the rollers, the construction and mode of operation of the parts being substantially such as is herein described.

In testimony whereof I have signed my name to this specification in the presence of two subscribing witnesses.

THOS. H. McFARLAND.

Witnesses:
  TREAT T. PROSSER,
  H. W. ANDERSON.